No. 754,023. PATENTED MAR. 8, 1904.
E. S. STIMPSON.
FILLING FORK FOR LOOMS.
APPLICATION FILED OCT. 31, 1903.
NO MODEL.
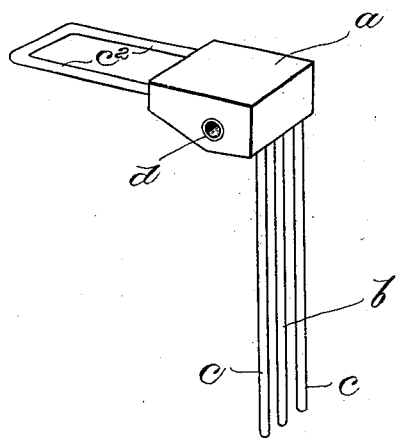
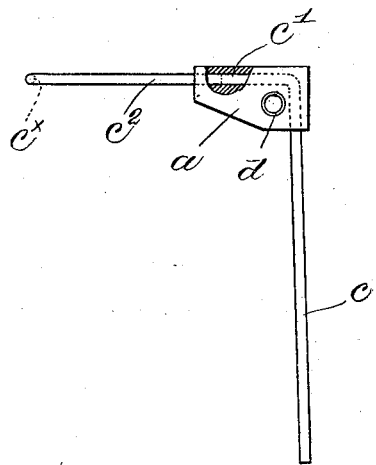
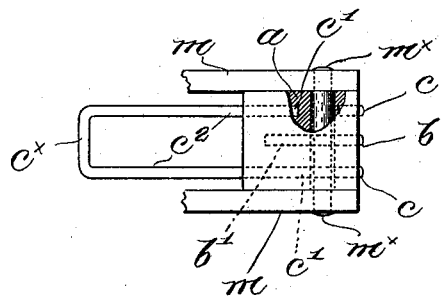
Witnesses.
Thomas J. Drummond
S. Wm. Lutton
Inventor.
Edward S. Stimpson
by Crosby Gregory
Attys.

No. 754,023. Patented March 8, 1904.

UNITED STATES PATENT OFFICE.

EDWARD S. STIMPSON, OF HOPEDALE, MASSACHUSETTS, ASSIGNOR TO DRAPER COMPANY, OF HOPEDALE, MASSACHUSETTS, A CORPORATION OF MAINE.

FILLING-FORK FOR LOOMS.

SPECIFICATION forming part of Letters Patent No. 754,023, dated March 8, 1904.

Application filed October 31, 1903. Serial No. 179,283. (No model.)

*To all whom it may concern:*

Be it known that I, EDWARD S. STIMPSON, a citizen of the United States, and a resident of Hopedale, county of Worcester, State of Massachusetts, have invented an Improvement in Filling-Forks for Looms, of which the following description, in connection with the accompanying drawings, is a specification, like letters on the drawings representing like parts.

This invention has for its object the production at small cost of a simple and efficient filling-fork for looms.

Filling-forks comprise a body and wire prongs or tines, and ordinarily the body is made in two parts, one having grooves to receive the bent-over upper ends or roots of the tines, while the other part is bolted thereon to secure the tines in place. In accordance with my present invention I make the body in one piece, of brass, Babbitt metal, or other readily-cast metal, and the tines are so placed with relation to a body-mold that when the molten metal is poured therein the roots of the tines will be embedded therein and securely held without the aid of other means. I prefer to also embed in the cast metal a transverse bearing-sleeve, into which a pin or fulcrum-rod is extended from the bifurcated end of the usual fork-slide to pivotally connect the fork therewith. The sleeve serves as a bearing or wearing surface interposed between the fulcrum-pin and the body.

Figure 1 is a perspective view of a filling-fork embodying my invention. Fig. 2 is a side elevation thereof, the body being partly in section; and Fig. 3 is a top or plan view, the body being broken out to show the bearing-sleeve, and the root of one of the tines is also broken out.

The body $a$ of the filling-fork is made as a casting of the desired shape, brass, Babbitt metal, or other readily-cast metal being poured into a suitable mold. The tines are herein shown arranged in a convenient manner, the central tine $b$ having its upper end bent to form a root $b'$, which is embedded in the body when the latter is cast. The outer tines $c$ are also bent at their upper ends, as at $c'$, to be embedded in the body, and in order to conveniently form the loop or tail said portions $c'$ are extended beyond the end of the body, as at $c^2$, and connected by the transverse portion $c^\times$. The tines are made of stout wire, as is usual, and it will be seen that a single piece of wire forms the tail and the two outer tines $c\ c$. A sleeve or tube $d$, of hard brass or other suitable metal, is embedded transversely in the body, extending from one to the other side thereof below the upper bent ends or roots of the tines.

When the fork is mounted on the bifurcated end $m$ of the usual fork-slide, (see Fig. 3,) a pin or rod $m^\times$ is extended through the sleeve to pivotally connect the fork and slide.

The construction is simple and cheap, and a strong and durable fork is obtained, requiring no boring, machining, or other finishing.

Having fully described my invention, what I claim as new, and desire to secure by Letters Patent, is—

1. As a new article of manufacture, a filling-fork comprising a cast-metal body, wire tines and a loop or tail, the roots of the tail and tines being permanently embedded in the metal of the body.

2. As a new article of manufacture, a filling-fork comprising a cast-metal body and tines the roots whereof are permanently embedded in the body, and a transverse bearing-sleeve also embedded in the body.

In testimony whereof I have signed my name to this specification in the presence of two subscribing witnesses.

EDWARD S. STIMPSON.

Witnesses:
 GEORGE OTIS DRAPER,
 ERNEST WARREN WOOD.